(12) United States Patent
Strathmeyer et al.

(10) Patent No.: US 7,668,306 B2
(45) Date of Patent: Feb. 23, 2010

(54) METHOD AND APPARATUS FOR CONNECTING PACKET TELEPHONY CALLS BETWEEN SECURE AND NON-SECURE NETWORKS

(75) Inventors: Carl R. Strathmeyer, Reading, MA (US); Hugh P. Mercer, Hollis, NH (US); Donald K. Finnie, Reading (GB); Rameshkumar G. Illikkal, Portland, OR (US); Bounthavivone K. Phomsopha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1331 days.

(21) Appl. No.: 10/095,138

(22) Filed: Mar. 8, 2002

(65) Prior Publication Data

US 2003/0169859 A1    Sep. 11, 2003

(51) Int. Cl.
*H04M 7/00* (2006.01)
*H04L 12/66* (2006.01)

(52) U.S. Cl. ...................... 379/219; 370/352
(58) Field of Classification Search ............. 379/219; 370/352
See application file for complete search history.

(56) References Cited

U.S. PATENT DOCUMENTS

| | | | |
|---|---|---|---|
| 6,026,086 A | 2/2000 | Lancelot et al. | |
| 6,047,194 A | 4/2000 | Andersson | |
| 6,130,893 A * | 10/2000 | Whittaker et al. | 370/420 |
| 6,134,235 A * | 10/2000 | Goldman et al. | 370/352 |
| 6,230,002 B1 | 5/2001 | Floden et al. | |
| 6,233,234 B1 * | 5/2001 | Curry et al. | 370/356 |
| 6,262,978 B1 * | 7/2001 | Bruno et al. | 370/260 |
| 6,359,977 B1 | 3/2002 | Rudd et al. | |
| 6,496,867 B1 * | 12/2002 | Beser et al. | 709/245 |
| 6,523,068 B1 * | 2/2003 | Beser et al. | 709/238 |
| 6,560,216 B1 * | 5/2003 | McNiff et al. | 370/349 |
| 6,611,516 B1 * | 8/2003 | Pirkola et al. | 370/352 |
| 6,614,781 B1 * | 9/2003 | Elliott et al. | 370/352 |
| 6,654,373 B1 * | 11/2003 | Maher et al. | 370/392 |
| 6,757,266 B1 | 6/2004 | Hundscheidt | |
| 6,963,561 B1 * | 11/2005 | Lahat | 370/356 |
| 7,047,561 B1 * | 5/2006 | Lee | 726/12 |
| 7,088,739 B2 * | 8/2006 | DeMars et al. | 370/476 |
| 7,145,900 B2 * | 12/2006 | Nix et al. | 370/352 |
| 7,502,339 B1 * | 3/2009 | Pirkola et al. | 370/310 |

FOREIGN PATENT DOCUMENTS

| | | |
|---|---|---|
| DE | 100 40 444 A 1 | 3/2002 |
| EP | 0841831 | 5/1998 |

(Continued)

OTHER PUBLICATIONS

Donnemiller C., "IP Lernt Dazu", Nachrichtentechnik Elektronik, Veb Verlag Technik. Berlin, DE, vol. 49, No. 7/8, Aug. 1999, pp. 30-31, XP000849240.

(Continued)

*Primary Examiner*—Curtis Kuntz
*Assistant Examiner*—Joseph T Phan
(74) *Attorney, Agent, or Firm*—Blakely, Sokoloff, Taylor & Zafman LLP

(57) ABSTRACT

Described herein is a method and apparatus for connecting packet telephony calls between secure networks and non-secure networks.

11 Claims, 13 Drawing Sheets

FOREIGN PATENT DOCUMENTS

| | | |
|---|---|---|
| EP | 1117214 | 7/2001 |
| EP | 1 217 804 A2 | 6/2002 |
| GB | 2327516 | 1/1999 |
| JP | 2001169353 | 6/2001 |
| TW | 447205 | 7/2001 |
| WO | WO-97/40610 | 10/1997 |
| WO | WO-9933226 | 1/1999 |
| WO | WO 99/33226 | 7/1999 |
| WO | WO-0011567 | 3/2000 |
| WO | WO-0079807 | 12/2000 |
| WO | WO-0108377 | 2/2001 |
| WO | WO-0111856 | 2/2001 |
| WO | WO 02/11400 A1 | 2/2002 |
| WO | WO 02/15463 A1 | 2/2002 |
| WO | WO 02/19644 A1 | 3/2002 |

OTHER PUBLICATIONS

Roedig U. et al: "Evaluating and Improving Firewalls for IP—Telephony Enviornments", Internet Apr. 12, 2000, XP002199645, 6 pages retrieved from Internet on May 21, 2002, url: http://www.fokus.gmd.de/research/cc/glone/projects/ipte/2000/cre/65/Roedig.pdf.

Office Action mailed Mar. 13, 2009, with translation, for Chinese Patent Application No. 03808519.4, Whole document.

EPO, Office Action for European Application No. 03744181.3, mailed Feb. 2, 2009, 5 pgs.

International Application No. PCT/US03/06644; Written Opinion dated Dec. 10, 2004.

Search Report for Patent Application ROC No. 092104913 mailed Aug. 11, 2008.

"Search Report", International Application No. PCT/US03/06644; Issued Aug. 1, 2003. whole document.

CN PTO, "First Office Action", PRC Patent Application No. 03808519.4 (PCT/US2003/006644); Mailed Aug. 19, 2008. Whole Document.

CN PTO "Notice of Allowance", Chinese Application No. 03811352.X, Mailed Sep. 18, 2009. Whole Document.

EP PTO, "First Exam Report", European Application No. 03744181.3-2414, Issued Sep. 1, 2005. Whole Document.

IN PTO "First Examination Report", Application No. 2747/DELNP/2004, Mailed Dec. 27, 2005.

* cited by examiner

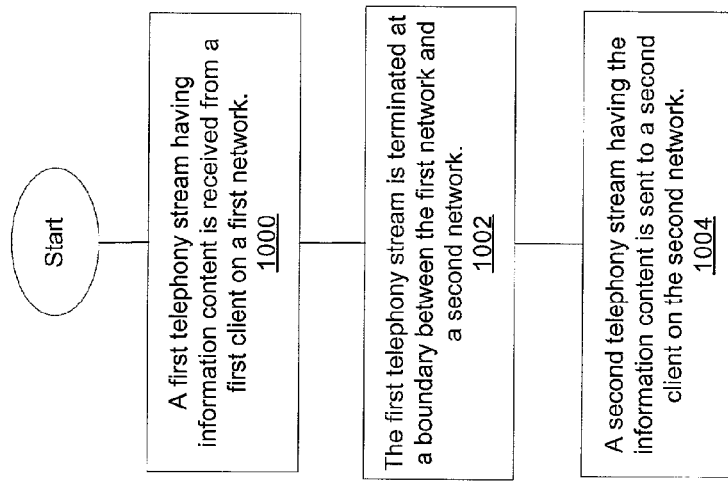
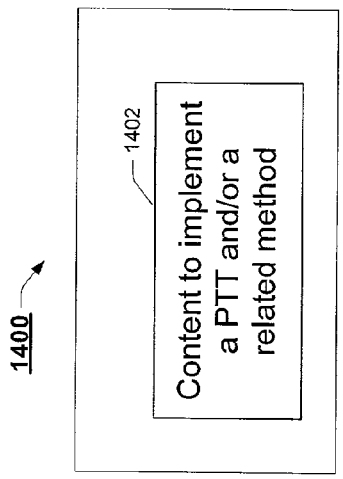

METHOD AND APPARATUS FOR CONNECTING PACKET TELEPHONY CALLS BETWEEN SECURE AND NON-SECURE NETWORKS

TECHNICAL FIELD

The present invention generally relates to the field of telephony communications and, more particularly, to a method and apparatus for connecting packet telephony calls between secure networks and non-secure networks.

BACKGROUND

With the proliferation of computing devices it is often desirable to network such devices, i.e., communicatively couple such devices, through data networks to facilitate the exchange of information between such devices. In corporate data networks, however, there is often an interest in securing the information resident within a corporate network from intrusion and/or attacks from external third-parties, i.e., attacks through an Internet connection to the corporate intranet. Accordingly, filtering technology, which discriminates between data packets based on the header of each data packet, has been developed to control the passage of packet-based data traffic between networks. Before commercial firewalls became available, network administrators began formulating rules that could be statically applied to filter out unwanted and malicious traffic. However, such static packet filtering had many disadvantages, including allowing external clients to directly connect to internal hosts. An unfriendly user could take over a trusted external host and gain malicious access to the entire internal network with relative ease through the direct connection.

Dynamic packet filtering was developed to solve some of the problems of static packet filtering. Dynamic packet filters allow a temporary "window" in a firewall based on packet header information. The temporary window in the firewall is closed once a series of packets have reached their destination. Since the amount of time the window in the firewall is open is much shorter compared to a static packet filter, many types of attacks that work against a static packet filter are more difficult to deploy against a dynamic packet filter. However, dynamic packet filtering still allows the possibility of direct IP connections between an internal host and an external client.

One emerging application that is typically not supported by conventional corporate firewalls is colloquially referred to as Internet telephony, Internet Protocol (IP) telephony, or "packet telephony:" that is, telephony between networks using IP data packets. One example protocol for packet telephony is formally described in the International Telecommunication Union-Telecommunication Standardization Sector (ITU-T) standard entitled, "Draft H.323v4." As one example packet telephony standard, H.323 specifies the components, protocols, and procedures that provide telephony services, i.e., real-time audio, video, and data communications over packet networks, including IP-based networks. The protocols specified by H.323 are audio codecs; video codecs; subprotocols such as H.225 which defines a call setup sequence based on Q.931 operations including registration, admission, and status (RAS); H.245 control signaling; real-time transfer protocol (RTP); and real-time control protocol (RTCP). However, H.323 is independent of the packet network and the transport protocols over which it runs and does not specify them.

H.323 gateways for telephony traffic between IP networks are known. In this regard, such conventional gateways provide for the translation of protocols for call setup and release, media format conversion between different networks, and the transfer of information between H.323 and non-H.323 networks. In IP telephony, an H.323 gateway may connect an IP network and a circuit-switched network, such as an analog or digital public switched telephone network (PSTN) or an integrated services digital network (ISDN).

However, in the case of packet telephony between networks, it is a well-known problem that the security of a packet telephony exchange is not reliably provided by standard packet protocol firewalls and H.323 gateways. The telephony data packets may appear to the firewall or gateway to be unsolicited insofar as they are streamed from an IP address that has not been targeted by an intranet client and therefore the telephony exchange may be refused. Or, the telephony exchange may be allowed, resulting in a direct connection between a potentially malicious external entity and the intranet client. The potentially malicious external entity then has direct access to the intranet client, and often to the entire intranet.

BRIEF DESCRIPTION OF THE DRAWINGS

The present invention is illustrated by way of example, and not by way of limitation, in the figures of the accompanying drawings in which like reference numerals refer to similar elements and in which:

FIG. 10 is a flowchart of one example method of stream transforming, according to one aspect of the present invention;

FIG. 14 is a block diagram of an article of manufacture, including an example storage medium comprising a plurality of executable instructions which, when executed, cause an accessing machine to implement one or more aspects of a packet telephony transformer (PTT) of the invention, in accordance with an alternative embodiment of the present invention.

DETAILED DESCRIPTION

Figure 1:
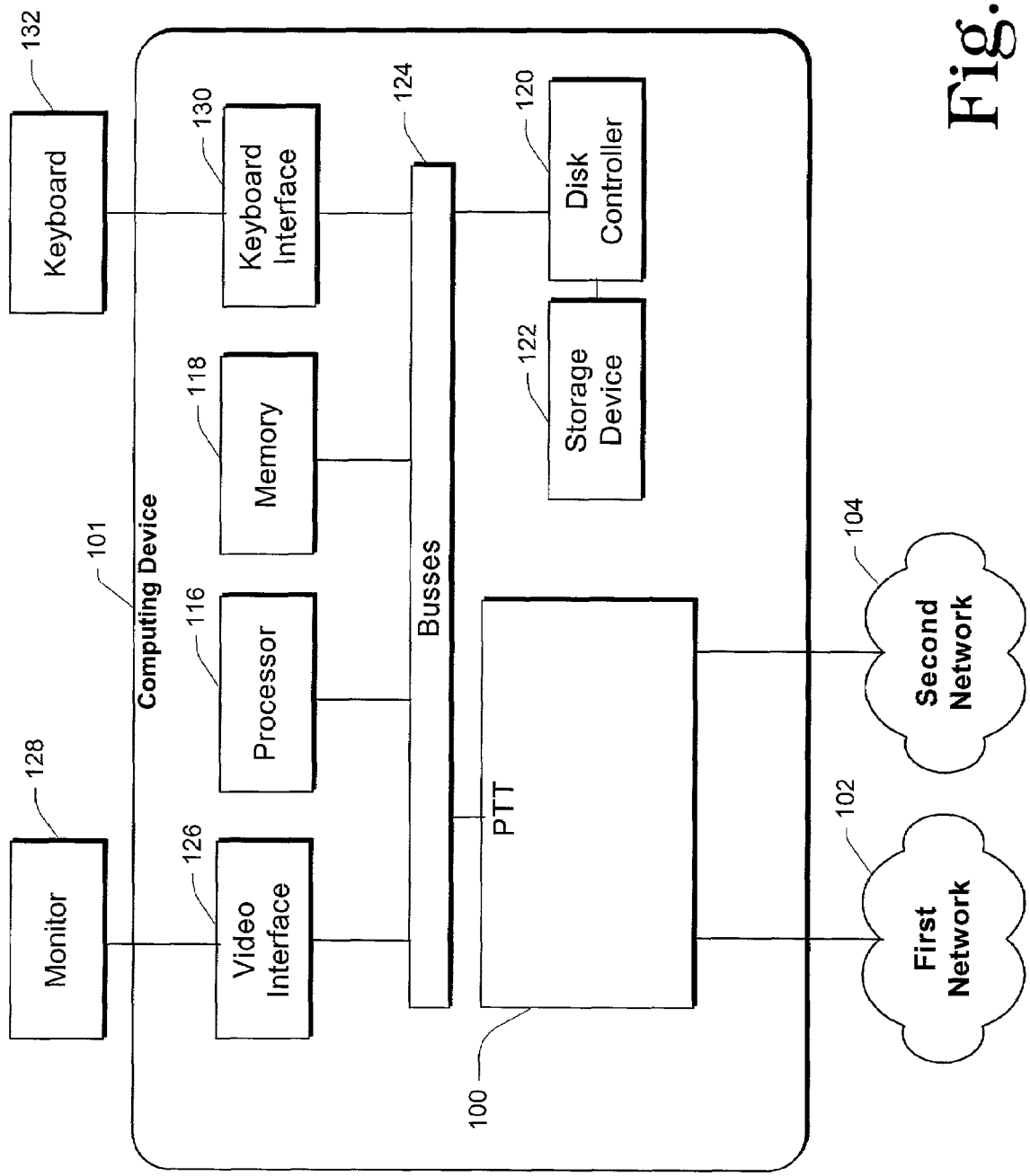
FIG. 1 is a block diagram of an example computing device incorporating the teachings of the present invention, in accordance with one example implementation of the present invention.

Described herein is a method and apparatus for connecting packet telephony calls between secure networks and non-secure networks.

In accordance with the teachings of the present invention, a packet telephony transformer (PTT) is introduced, unencumbered by the inherent limitations commonly associated with conventional packet filters and gateways for multimedia communications. As developed in greater detail below, the PTT provides a secure communications interface for telephony information content between any combination of secure and non-secure communications networks. That is, the PTT facilitates any of a wide range of telephony services through a firewall-like security infrastructure to maintain the secure integrity of a protected network. For example, the PTT may allow the public to gain telephony access through a firewall to managed and/or secure servers and services without compromising the security of the managed and/or secure network.

According to one example implementation, the PTT is provisioned with a "stream transformer" security feature: a dual-homed network-insulating proxy that, in one embodiment, functions on an IP application level, such as the application level of the Open Systems Interconnection (OSI) standard for data communications. The stream transformer terminates an incoming "first leg" of a telephony stream ("stream" or "call") at the boundary of a protected network, and initiates a new, separate, safe "second leg" stream within the protected network. The process of terminating a first call at a network boundary and initiating a second call on the other side of the boundary (the second call replicating only the "meaning" or "information content" of the first call) is herein referred to as "stream transformation."

Although the sending network, by sending a stream to the PTT, may (or may not) induce the PTT to initiate an analogous and/or corresponding stream within the protected network, the sending network has no access to the physical and/or protocol layers of the protected network, as will be described more fully below. Conversely, a client within the protected network may initiate a telephony connection from within the protected network that is extended by the PTT into the unprotected network and/or the outside world without exposing either the true identity of the endpoint in the protected network or the topology of the protected network.

Although a PTT has network interfaces coupled to the two or more networks being isolated from each other, (i.e., the PTT is dual-homed or multi-homed), the stream transformer completely insulates the networks from each other by transferring only the data content ("information content") of a telephony communication between telephony streams. Information content is the "call content," the "data structure," and/or the "telephony information payload," i.e., the "meaning," carried by the telephony stream. Thus, the data content may be transferred by making a replica of the information carried by one telephony stream and imposing the replica on another telephony stream. In other words, the form of the data is transferred, but not the physical data stream itself. In some variations, all or some of the call "payload" (i.e., the data packet payload carrying the telephony information content) may be passed between networks through a media router or a deep packet inspection engine under the control of a PTT. Since only the information content is transferred between telephony streams, a telephony client on one network has no direct (for example, physical, electronic, administrative) access to the clients, topology, and network administration of other networks that use one or more PTTs.

In addition, the PTT may well be provisioned with a portable protocol translator, in accordance with another aspect of the present invention. As discussed above, the stream transformer is dual-homed or multi-homed, having a network interface in each of two or more networks. The first leg stream sent to a first network, for instance a protected network (i.e., sent by way of the PTT), may be of any format and/or protocol. Since a second leg stream initiated by the stream transformer is separate and completely insulated from the first leg stream, the second leg stream may likewise be of any format and/or protocol (i.e., selected as being best suited to the receiving client). In accordance with this aspect of the present invention, the stream transformer receives the first leg stream in accordance with its associated first leg communication protocol, and translates the first leg communication protocol to a dynamically selected second leg communication protocol. Since any stream protocol may be used on each side of the stream transformer, the stream transformer may be provisioned to automatically translate between any two protocols.

According to certain implementations, the PTT is also provisioned with an address transformer (AT), in accordance with yet another aspect of the present invention. A trusted client within a protected network may register a private and/or trusted address with a PTT. The AT assigns a public version of the client's private and/or trusted address ("alias") to the trusted client. The AT may publicize the alias on one or more secure or non-secure networks and may authorize the stream transformer of the PTT to perform an insulated stream transform between the trusted client and an untrusted client outside the trusted network that requests a connection to the alias. In accordance with one aspect of the invention, the untrusted client communicates with a first side of the stream transformer, which the untrusted client sees as the endpoint bearing the alias. The second side of the stream transformer initiates a separate second leg stream between itself and the trusted client. The second leg stream is completely insulated from the first leg stream and, as mentioned above, may differ from the first leg stream in format and/or protocol. The trusted client sees the second side of the stream transformer as the endpoint of the untrusted client. Thus, in one implementation, the AT may cause the stream transformer to be a dual endpoint conduit between IP telephony networks.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Turning now to FIG. 1, a block diagram of an example computing device 101 is depicted, incorporating an example PTT 100, according to one example implementation of the present invention. In addition to including and/or having access to the PTT 100 incorporating one or more aspects of the invention, the computing device 101 may contain one or more of a processor 116, a memory 118, and a disk controller 120 coupled by one or more busses 124. The disk controller 120 may control a data storage device 122 or several data storage devices. The processor 116 accesses data, including computer programs that may be stored in the storage device 122. In addition, the processor 116 transfers computer programs into the memory 118 and executes the programs once resident in the memory. A video interface 126 may couple a monitor 128 to the system, and a keyboard interface 130 may couple a keyboard 132 to the system. A person having ordinary skill in the art will appreciate that a computing device 101 suitable for practicing one or more aspects of the invention may contain additional or different components.

According to one implementation of the present invention, the PTT 100 may be connected to a first network 102 and a second network 104. In other variations, the PTT 100 may be connected to more than two networks, and/or more than one PTT 100 may be connected to any number of networks.

A PTT 100 may possess one or more of its own processors and/or control logic, or may use a processor 116 or processors of the host computing device 101. A PTT 100 may also possess its own memory for implementing one or more aspects of the invention, and/or may avail itself of the memory 118 of the computing device 101. Likewise, the PTT 100 may be provisioned to contain its own applications, for instance in the form of software and/or instructions, and/or the PTT 100 may use applications stored on the storage device 122 of the computing device 101 accessed by the disk controller 120. The PTT 100 may be accessible and/or programmable using the video interface 126, monitor 128, keyboard interface 130, keyboard 132, and/or equivalent input devices, but in other variations a computing device 101 or computing environment hosting a PTT 100 may not possess these elements, as will be appreciated by persons having ordinary skill in the art.

Although the illustrated example PTT 100 is depicted in block form suggesting a hardware module, it should be noted that a PTT 100 may be comprised of software, or any combination of software, hardware, objects, procedures, components, subcomponents, modules, routines and/or subroutines.

Figure 2:
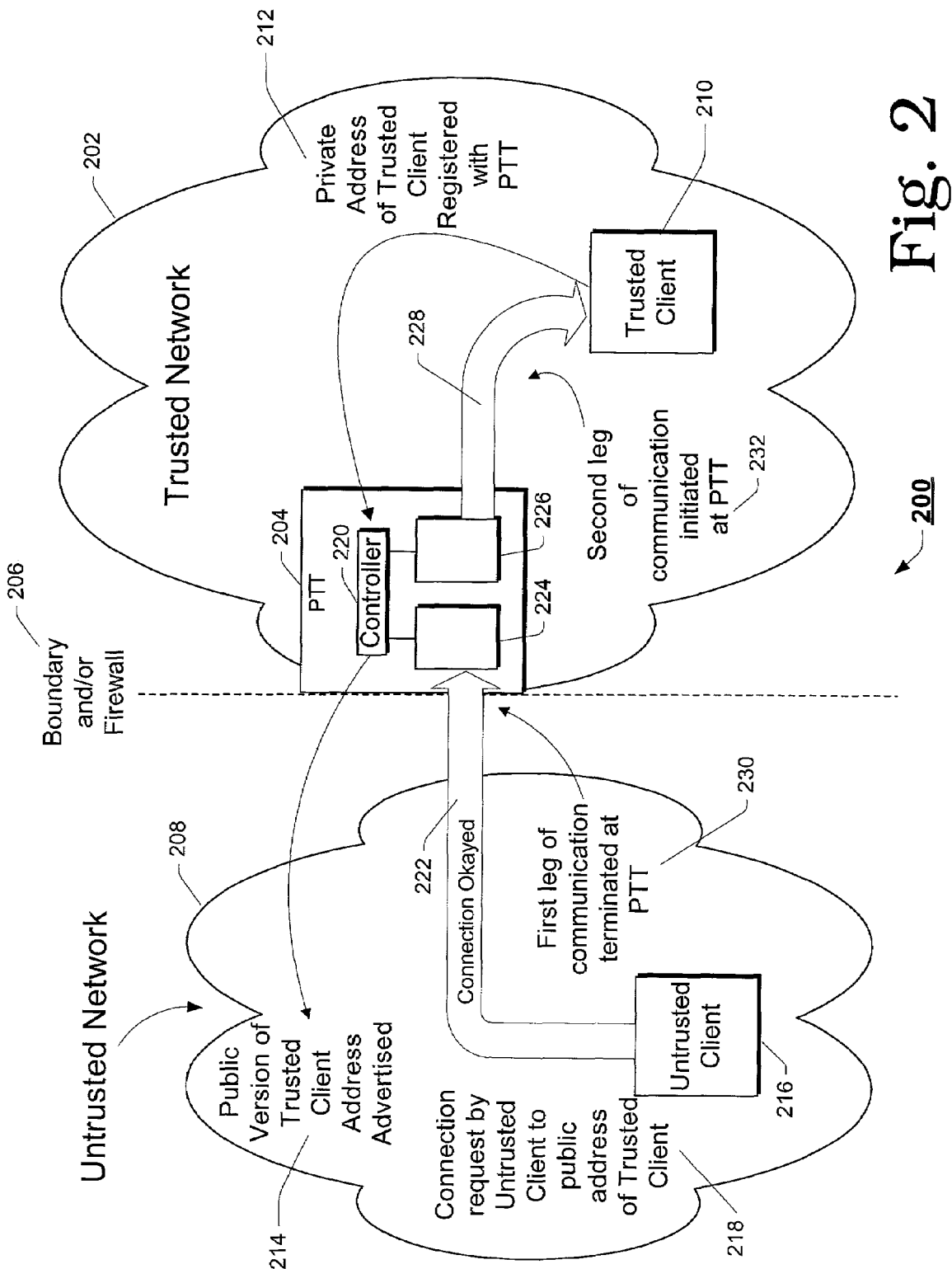
FIG. 2 is a block diagram of an example configuration of networks incorporating the teachings of the present invention, in accordance with one example implementation of the present invention.

FIG. 2 is a graphical illustration of an example configuration of networks 200 providing an environment for implementing an example PTT 204 of the invention. A PTT 204, a trusted network 202, an untrusted network 208, and a boundary 206 between the trusted network 202 and the untrusted network 208 are depicted in relation to each other as illustrated. The boundary 206 may also comprise a firewall. The private, protected, and/or secure ("trusted") network 202 employs the PTT 204 at the boundary 206 between the trusted network 202 and the non-secure outside world, which in the illustrated example configuration includes the example public, unprotected and/or non-secure ("untrusted") network 208. Although the untrusted network 208 is used to depict any example network beyond the secure boundary 206 of the trusted network 202, it should be noted that one or more implementations of the present invention may be used between two trusted networks, or any combination of trusted and untrusted networks.

In accordance with one aspect of the invention, a trusted client 210 in the trusted network 202 registers a private address 212 with a PTT 204. The PTT 204 assigns an alias to the private address of the trusted client 210, and may publicize, advertise, and/or otherwise grant access to the alias. An untrusted client 216 may request a connection to the public address representing the trusted client 210 from the PTT 204. One or more elements of a controller 220 of the PTT 204 may allow or deny the connection request based, in accordance with one aspect of the invention, on communication permissioning policy built into and/or programmed into the particular controller 220. If the requested connection is authorized by the controller 220, then a first stream 222 from the untrusted client 216 is received by the PTT 204, and is received by various layers of a first protocol stack 224, but terminates at the controller 220. In other words, the first leg 230 of a communication between the untrusted client 216 and the trusted client 210 terminates at the PTT 204.

The controller 220 of the PTT 204 initiates a second stream 228, which comprises a second leg 232 of the communication between the untrusted client 216 and the trusted client 210. The second stream 228 is transmitted from the controller 220 through a second protocol stack 226, which may implement different or partly different protocols than the first protocol stack 224. The first stream 222 and the second stream 228 are separate communication legs 230, 232 that are completely insulated from each other, and may be completely different in format, protocol, and medium. Thus, the trusted network 202 is isolated from direct physical access by the untrusted network 208. The controller 220 transfers information content and/or call payload from the first stream 222 to the second stream 228.

The trusted client 210 can also initiate a connection, in which case a stream would proceed from the trusted client 210 to the second protocol stack 226 and be terminated by the controller 220. A second stream would then be initiated by the controller 220 and proceed from the first protocol stack 224 to the untrusted client 216.

In other variations, the controller 220 may delegate the transfer of payload to other mechanisms that maintain isolation between networks. It will be appreciated by persons having ordinary skill in the related arts that the foregoing description depicts a controller 220 of the PTT 204 that insulates networks, transfers data content between streams, translates private and public addresses, and translates protocols between networks, while insulating the streams from each other and the networks from each other. It will also be appreciated by persons having ordinary skill in the art that the first and second protocol stacks 224, 226 and their network interfaces may assume a wide variety of forms and configurations depending on the types of networks coupled to each side of a PTT 204.

The PTT 204 may act as a stateful inspection proxy for the firewall 206. For example, an H.323 client on an example trusted "network address translation" (NAT) enabled network may connect with an H.323 client in an untrusted network, such as the Internet. The PTT 204 may authenticate users, log call information, and direct the use of specified port ranges. In one variation, a second PTT external to the firewall 206 of the trusted network 202 may register the untrusted client 216. In this case, the connection may proceed through both the trusted PTT 204 and the external PTT. Both PTTs may allow or reject connections between the trusted client 210 and the untrusted client 216. Thus, the invention has the advantage that any PTT (including PTTs implementing stream management functions that may be present on either or both sides of the PTT) can be totally independent. When a stream must be connected through multiple networks, it is likely that various firewalls, gateways, and PTTs will be involved in the path. The PTTs create a secure boundary so that each PTT used may operate without interference in its own domain, and can provide a secure packet telephony stream bridge to other networks without merging topologies with the other networks or communicating non-securely beyond its side of a network boundary 206.

It will be appreciated by persons having ordinary skill in the related arts that the isolation of networks provided by the invention has the advantage of allowing flexibility of protocol usage, for example, in service provider networks and customer premise networks. A first PTT may allow example media gateway control protocol (MGCP)-based customers to participate in a service provider network. A second PTT may allow example session initiation protocol (SIP)-based customers to participate in the same service provider network. Thus, the customer premises can use different protocols than the protocol used in the service provider backbone. This may help to protect the service provider's network investment. Service providers can deploy a protocol specific network, for example, H.323, and later add other protocol support, such as SIP, MGCP, and/or proprietary protocols, by using the protocol translation aspect of the invention.

Figure 3:
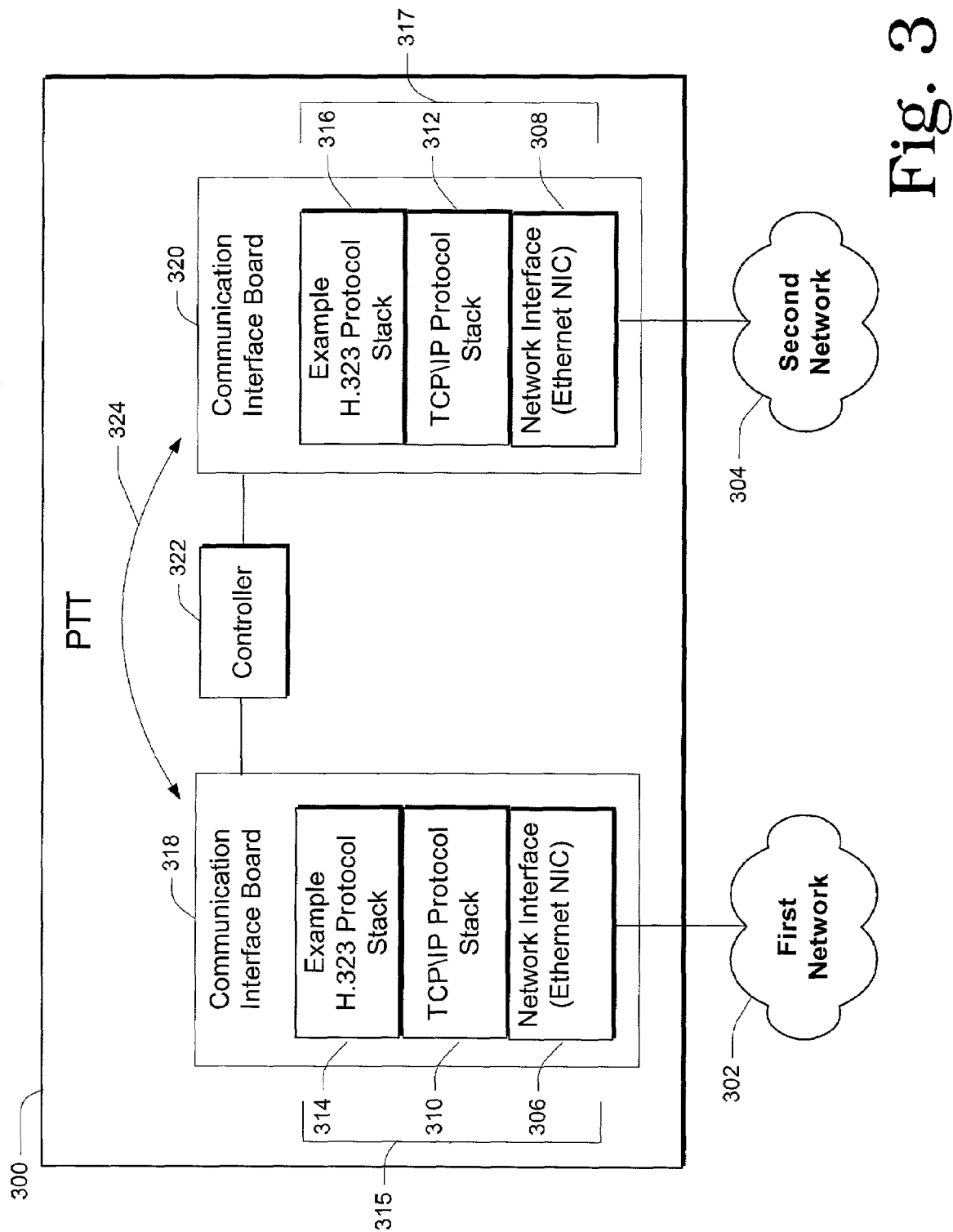
FIG. 3 is a block diagram of a first example embodiment of the invention.

FIG. 3 shows a first example PTT 300 having an example configuration of protocol stack sets 315, 317. The protocol stack sets 315, 317, a controller 322, a first communication interface board 318, a second communication interface board 320, a first packet telephony stream network 302 ("stream network"), and a second stream network 304 are coupled as depicted. In this implementation, the first stream network 302 and the second stream network 304 are each assigned complete and separate sets of physical network interfaces 306, 308, packet network protocol stacks 310, 312, and protocol stacks, in this case H.323 protocol stacks 314, 316, residing on the separate communication interface boards 318, 320. Each communication interface board 318, 329 is coupled to the controller 322 of the PTT 300. The actions of these two separate protocol stack sets 315, 317 are coordinated and controlled by the controller 322, which decides which streams may be transformed by the PTT 300 and may accomplish the information content and/or payload transfers between the protocol stacks 315, 317.

In accordance with one example implementation, stream payload may be transferred between the two stack sets 315, 317 via a time division multiplexing (TDM) bus 324, or by any other means that maintains separation between the protocol stack sets 315, 317 at the physical network interface level 306, 308, the packet network protocol level 310, 312, and the packet telephony stream protocol level 314, 316. For example, data structures within the controller 322 containing digitized segments of the stream payload could be transferred between networks 302, 304 while maintaining secure separation between protocol stack sets 315, 317.

Although the example embodiment illustrated in FIG. 3 shows a PTT 300 of the invention transforming streams between two example H.323 packet telephony stream networks 302, 304, many other variations are possible. Different physical network interfaces 306, 308, such as asynchronous transfer mode (ATM) instead of Ethernet, could be used in one or both protocol stack sets 315, 317. A different packet network protocol 310, 312, such as a proprietary version of transmission control protocol/Internet protocol (TCP/IP) that supports multiple classes of services instead of standard TCP/IP, could be used in one or both protocol stack sets 315, 317. A different telephony stream protocol 314, 316, such as SIP or MGCP, may be used in one or both protocol stack sets 315, 317. In other variations, both protocol stack sets 315, 317 may be partially or completely implemented in a host processor instead of in separate specialized communication interface boards 318, 320. The method of transferring stream payload by transferring digitized payload segments in data structures could be performed by the host processor that implements the two protocol stack sets 315, 317. The invention may also be implemented as a single controller 322 object that creates the other necessary objects in the PTT 300.

When used in an example IP telephony implementation, the PTT 300 enables a secure connection of packet telephony calls between two TCP\IP networks 302, 304 without merging the topologies of the two networks 302, 304 and without causing any security problems related to TCP\IP traffic. The PTT 300 makes it impossible for one telephony network to determine the physical topology, packet network topology, and packet telephony topology of another network. Thus, two telephony networks 302, 304 remain isolated from each other on the physical, packet network, and packet telephony levels, as discussed above.

Some embodiments of a PTT 300 implemented for telephony are not limited to packet telephony, but may be used between packet and circuit-switched telephony networks, such as PSTN. Regardless of the types of telephony networks and protocols used on each side of a PTT 300, various telephony implementations of a PTT 300 may manage call policy, perform alias-to-private address translation, support routed call models and direct call models, store registered endpoint information, support call transfer services, support fast-connect and H.245 tunneling, support full event recording for network engineering, and support an event log, for instance, for serious errors. In some embodiments the PTT 300 may be signaled to terminate a connection between controlled endpoints, provide call forwarding for higher level applications, provide an option for direct routing request service, provide deflect service, provide make-call service, provide callback indications for RAS and Q.931 messages, and provide an interface to manage policy and user's information, as will be appreciated by persons having ordinary skill in related telephony arts. A PTT 300 may also be made fully configurable via computer operating system registry, and provide support for Web-based management support. Other variations of the PTT 300 may provide automatic detection of inbound and outbound calls, may turn inbound and outbound calls on and off, and may route RTP and RTCP packet audio and packet video streams.

Figure 4:
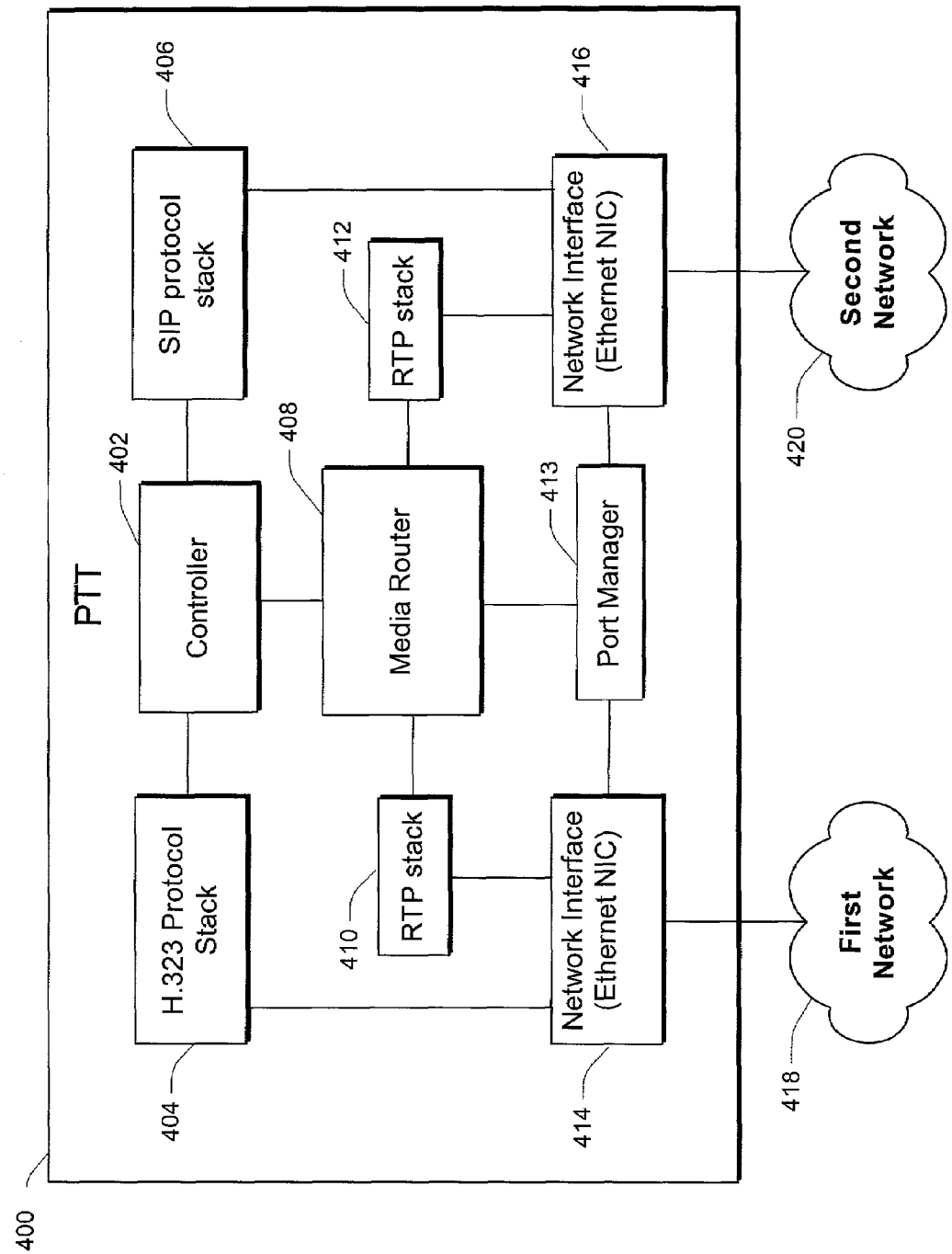
FIG. 4 is a block diagram of a second example embodiment of the invention.

FIG. 4 shows a second example PTT 400 having a controller 402, an example first telephony protocol stack, such as a H.323 protocol stack 404, an example second telephony stack, such as a SIP protocol stack 406, a media router 408, RTP stacks 410, 412, a port manager 413, network interface boards 414, 416, a first network 418, and a second network 420 all communicatively coupled as depicted. In this example implementation of a PTT 400, the controller 402 delegates transfer of payload content between first and second telephony streams to a media plane 408, 410, 412 which may comprise various media transfer modalities, in accordance with another aspect of the invention. A signaling plane maintained in the controller 402 handles connection requests, applies permissioning policy, and makes connection decisions ("signaling"). The media plane transfers data information content between insulated telephony streams. In the illustrated embodiment, the example H.323 protocol stack 404 (coupled to the first network interface 414 used by the first network 418) and the SIP protocol stack 406 (coupled to the second network interface 416 used by the second network 420) each exchange signals with the controller 402 to establish authorization for a "connection" by which stream transformation can occur.

The controller 402 delegates media transfer to the media router 408 that passes payload between the first RTP stack 410 coupled to the first network interface 414 and the second RTP stack 412 coupled to the second network interface 416. In this embodiment, the port manager 413 stores/manages the free and used ports information for network interfaces in the entire system. Prior to establishing the session, a media router 408 communicates with the port manager 413 to ascertain free ports to be used for address translation, replacing external addresses with internal addresses and/or vice versa). Once a communication session is closed, the media router 408 will recycle the ports it has used back to the port manager 413 for reuse.

Other embodiments are possible, including substituting protocols such as media gateway control protocol (MGCP) (Request for Comments 2805, "Media Gateway Control Protocol Architecture and Requirements," April 2000) or media gateway control (Megaco) (Request for Comments 3015, "Megaco Protocol Version 1.0," November 2000; and Request for Comments 3054, "Megaco IP Phone Media Gateway Application Profile," January 2001) for the H.323 and SIP protocols. It should be noted that using the same media codecs on both the first leg 414, 410, 408 of the media transfer and the second leg 408, 412, 416 of the media transfer can provide the advantage of avoiding media transcoding, with a resulting improvement in the efficiency of the media router 408.

In other implementations of the media plane discussed above, media routing speed may be increased using hardware acceleration. For example, wire speed routing hardware may be implemented for packet routing. For example, the routing hardware may use a network processor and/or Digital Signal Processing (DSP) based hardware. The illustrated media router 408 and RTP stacks 410, 412 could be replaced by a user datagram protocol-Internet protocol (UDP/IP) router. Thus, the processor-intensive signaling part of the invention may be executed by a host processor in the PTT 400 while the wire speed packet routing may be executed by a network processor and/or DSP based hardware. If a media manager is substituted for the media router 408, the media manager, in turn, may use the services of a dynamic link library (DLL) to pass audio and/or video packets. The DLL may provide generic port mapping (i.e., for UDP), packet passing between endpoints, session tracking, and filtering services.

Figure 5:
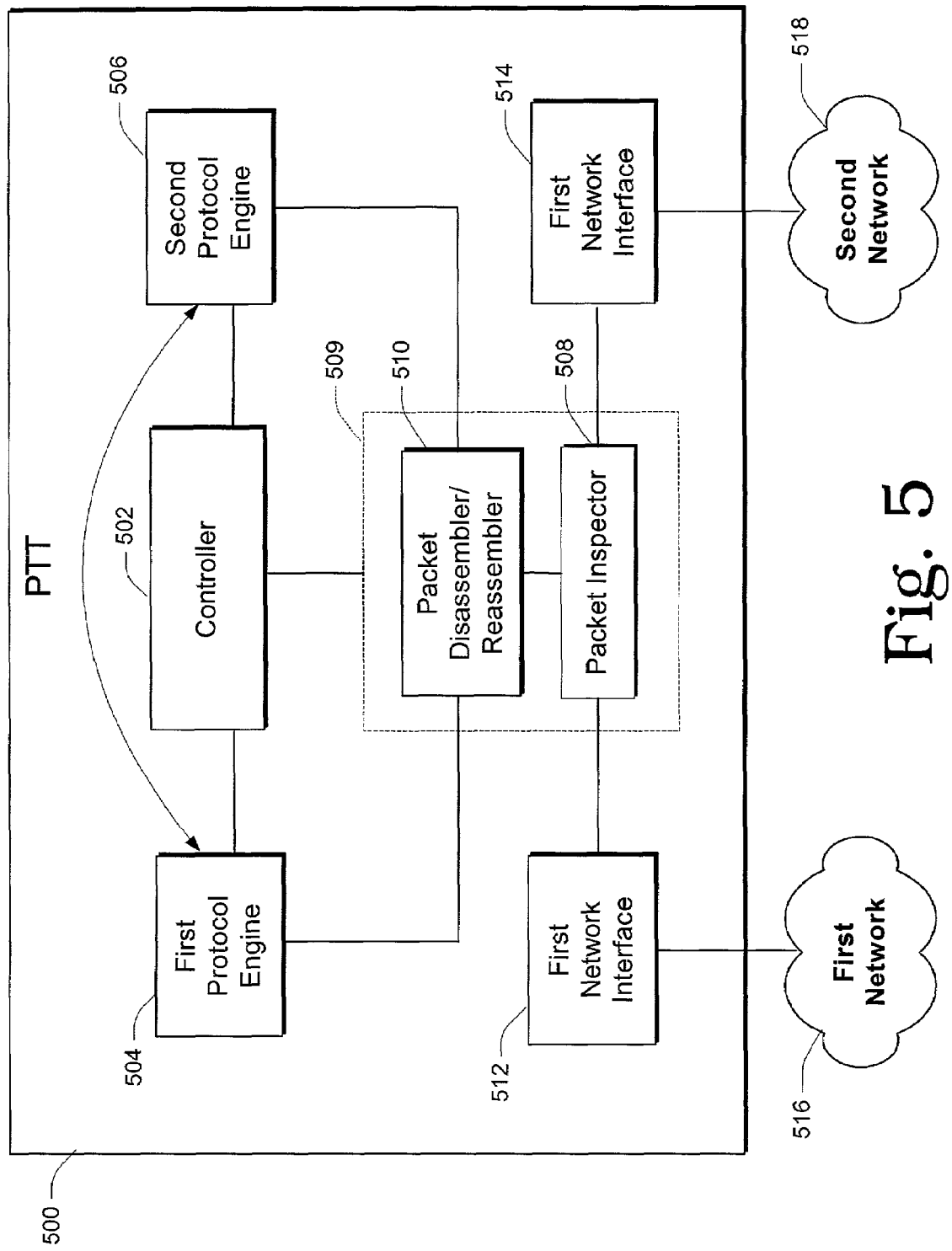
FIG. 5 is a block diagram of a third example embodiment of the invention.

FIG. 5 shows a third example PTT 500 embodiment, incorporating a deep packet inspection engine 509 for very high-performance packet telephony stream transformation at wire speeds. The example PTT 500 can read inside data packet payloads and if necessary modify the payloads before forwarding them.

The example PTT 500 may contain a controller 502, a first protocol engine 504, a second protocol engine 506, a packet inspector 508, a packet disassembler/reassembler (PDR) 510, a first network interface 512, and a second network interface 514 all communicatively coupled as illustrated. The first network interface 512 is coupled to a first network 516, and the second network interface 514 is coupled to a second network 518.

In this embodiment, the protocol engines 504, 506 process call setup and can process not only the (signaling packet) telephony connection protocols (e.g., H.323, SIP) but also the (call payload packet) talk-path transport protocols (e.g., RTP). The protocol engines 504, 506 can support all protocols used in their respective connections, and in some variations may include various protocol sub-engines, each processing one or more distinct protocols and working together to support a single connection.

Hardware acceleration can be used in some or all of the packet inspector 508, the PDR 510, the first network interface 512, and the second network interface 514 to enable the PTT 500 to efficiently inspect general network traffic (for instance the network traffic passing between the first network interface 512 and the second network interface 514) for the presence of data packets representing packet telephony calls. When telephony packets are recognized, they are removed from the network stream by the packet inspector 508 and passed to the PDR 510. There may be multiple PDRs 510 in an embodiment, the number being selected appropriately to match the processing requirements of a particular packet load and/or connection load. The PDR 510 inspects the header(s) of each packet received from the packet inspector 508 to determine which connection, that is, which protocol engine 504, 506 each packet is associated with. A packet (and/or its equivalent decoded information contents) is passed to one of the protocol engines 504, 506 handling that connection. The protocol engines 504, 506 exchange the information content and/or call payload with each other under instructions from the controller 502.

All or at least some of the protocol engine 504, 506 logic may be implemented in hardware. For example, the RTP payload protocols and the information content and/or call payload exchange may be implemented in hardware while the call setup protocols may be implemented in software operating on a host computing system.

Figure 6:
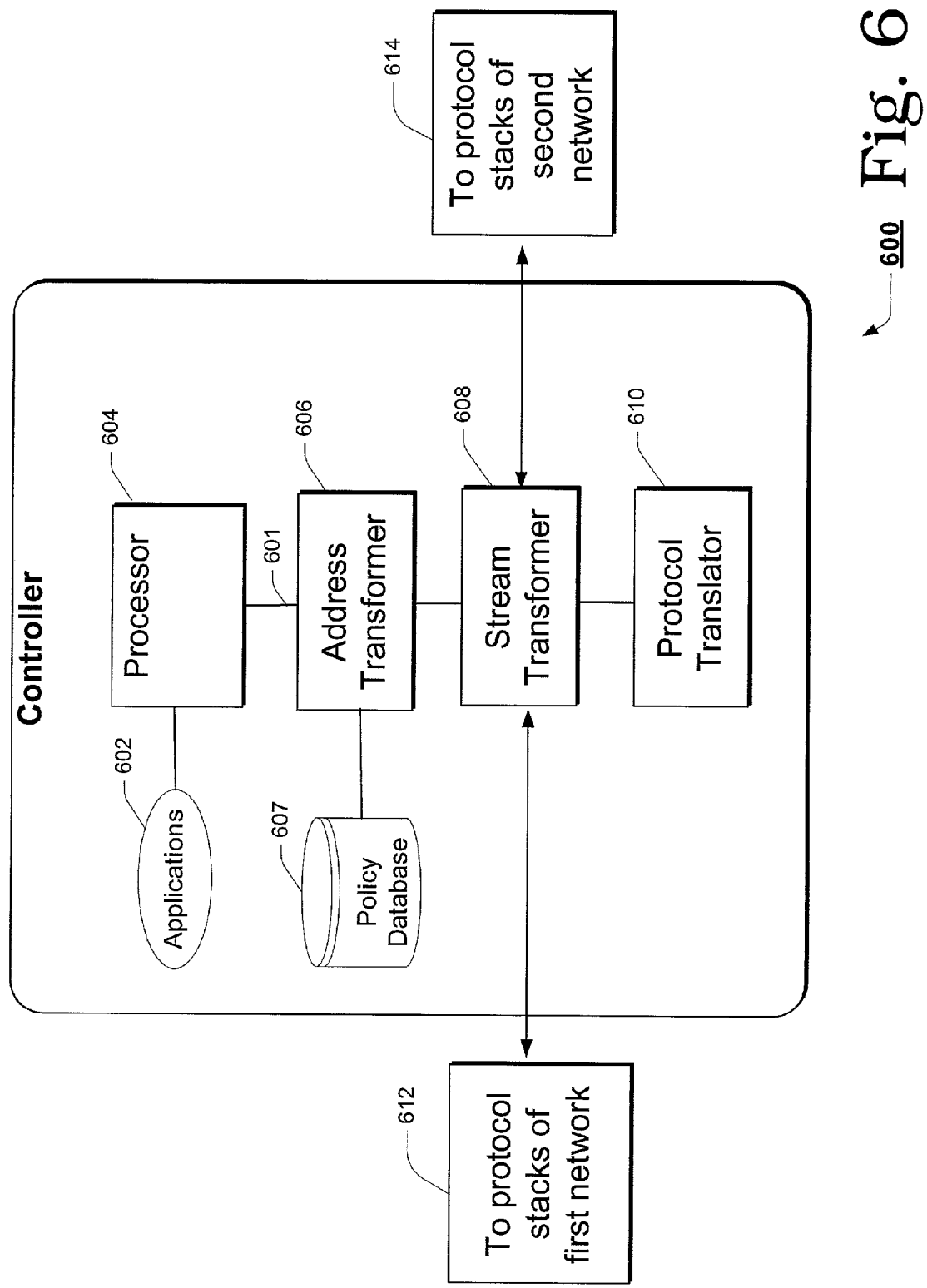
FIG. 6 is a block diagram in more detail of the example controller element of FIGS. 3 and 4, according to one example implementation of the present invention.

FIG. 6 shows an example controller 600 element of a PTT, according to one implementation of the invention. The example controller 600 includes at least one processor 604, applications 602, a stream transformer 608, a protocol translator 610, an AT 606, and a policy database 607 coupled by one or more busses 601 as shown. In some embodiments, the processor 604 may coordinate activities of all the other elements of the controller 600, or may be reserved to control only some of the elements. In other embodiments, a controller 600 may lack a processor 604 and instead rely on an external processor in a hosting computing device and/or hosting system. The stream transformer 608 is connected to two or more separate networks and may typically be coupled to a first set of protocol stacks for the first network 612 and to a second set of protocol stacks for the second network 614. Simplistically speaking, the stream transformer 608 receives a first stream from one network, terminates the stream, and initiates for the other network a second stream having the data content of the first stream. The stream transformer 608 will be described in greater detail in relation to a following figure.

According to another aspect of the invention, the controller 600 may include a protocol translator 610 coupled to the stream transformer 608 as shown. The protocol translator 610 may be statically programmed to translate between a first protocol used on a first network and a second protocol used on a second network, or alternately may be programmed to adaptively translate between any protocols used on any networks attached to a PTT. In one implementation, the protocol translator 610 senses the protocols used on two or more networks attached to a PTT and dynamically selects matching protocols for communication with each network and for translation of protocols between networks. The protocol translator 610 may be coupled to elements in the stream transformer that terminate and initiate streams, in order to sense one or more protocols being used and to initiate one or more protocols required for stream translation. The protocol translator 610 will be described in greater detail in relation to a figure that follows.

According to yet another aspect of the invention, the AT 606 and the policy database 607 may be coupled to each other and to the stream transformer 608 as illustrated. The AT 606 translates trusted addresses of clients on a trusted network into public addresses for publication and/or access on public and/or untrusted networks according to rules in the policy database 607. The policy database 607 may also retrieve and store information about registered endpoints and makes policy-based decision in response to RAS requests from remote endpoints. The AT 606 may dynamically translate between private and public addresses for the stream transformer 608. The AT 606 may also perform connection authorization between two networks and may therefore be coupled to a transform permissioning element in the stream transformer 610 that controls the activity of the stream transformer 610. The AT 606 will be described in greater detail in relation to a figure that follows.

Although the controller 600 is depicted as coupled modules, it should be noted that the modules may be parts of one or more software programs. The controller 600 may be comprised totally of software, or any combination of software, hardware, objects, procedures, components, subcomponents, modules, routines and/or subroutines.

Figure 7:
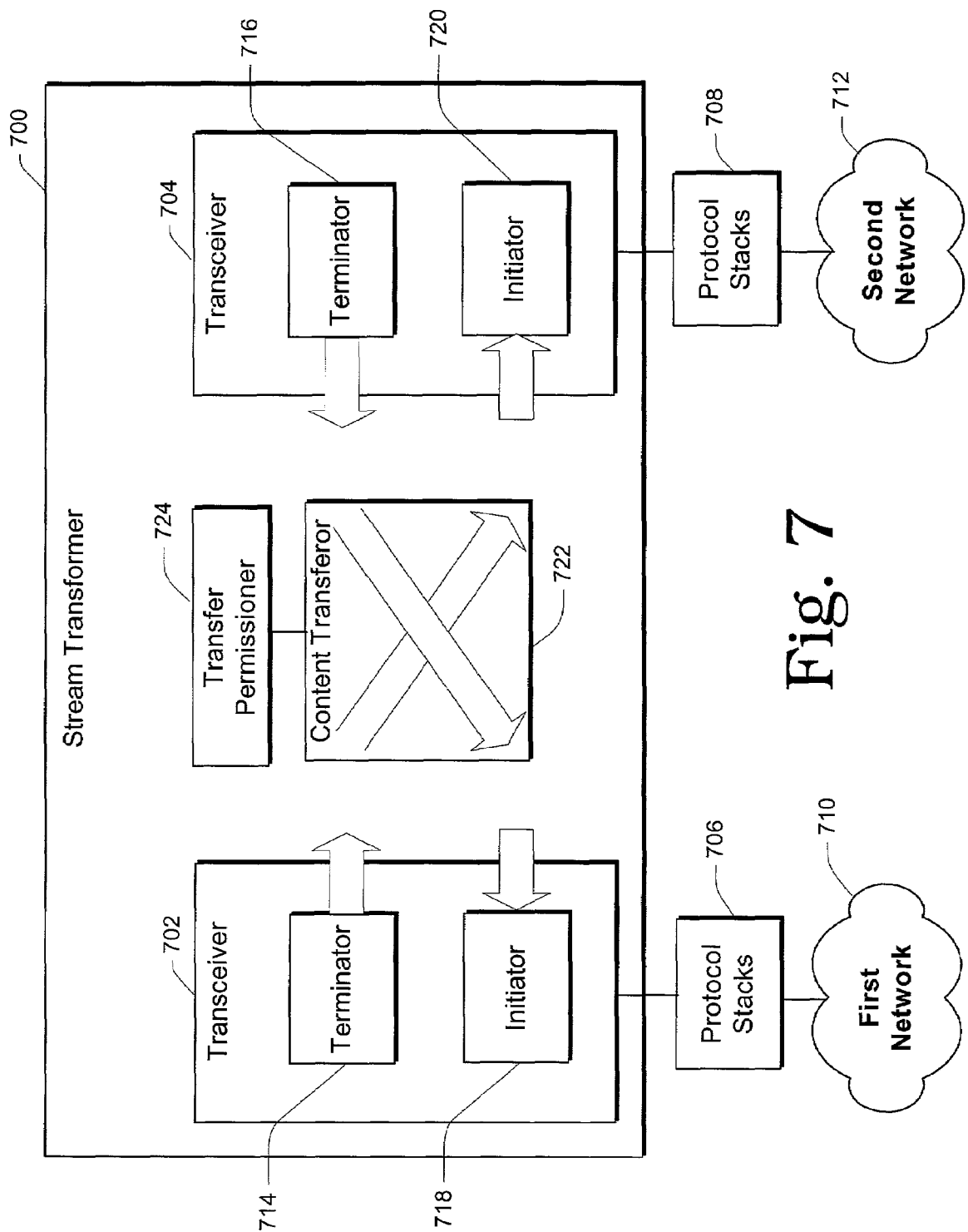
FIG. 7 is more detailed block diagram of the example stream transformer of FIG. 6 according to one example implementation of the present invention.

Turning now to FIG. 7 the example stream transformer 700 of FIG. 6 is shown in greater detail. A first transceiver 702 is depicted as including a first terminator 714 and a first initiator 718 and a second transceiver 704 is depicted as including a second terminator 716 and a second initiator 720. The first and second transceivers 702, 704 are insulated and/or isolated from each other on physical and protocol levels. The first transceiver 702 is coupled to a first set of protocol stacks 706 coupled in turn to a first network 710, and the second transceiver 704 is coupled to a second set of protocol stacks 608 coupled in turn to a second network 712. In the embodiment shown, streams from each network 710, 712 terminate at respective terminators 702, 704, which may relay data contents of the streams to a content transferor 722 element. The content transferor 722, which may be implemented in numerous modalities, transfers payload between the transceivers 702, 704. For example, the content transferor 722 may transfer the content from the first terminator 714 included in the first transceiver 702 to the second initiator 720 included in the second transceiver 704, or, from the second terminator 716 included in the second transceiver 704 to the first initiator 718 included in the first transceiver 702. Thus, the payload is typically transferred from the termination point of a first stream to the initiation point of a second stream. As discussed above, payload transfer may take place using a physical TDM bus, or alternately, may take place using an exchange of data structures within a processor included in a PTT, and/or a processor external to a PTT. The content transferor 722 may delegate payload transfer not only outside the stream transformer 700 (but still within a controller and/or PTT, as depicted in FIG. 4), but even delegate payload transfer outside a PTT, for example to an external media manager and/or network packet router.

A transfer permissioner 724 coupled to the content transferor 722 may govern payload transfer, and therefore in some embodiments may determine whether a second leg stream is allowed to be initiated following reception of a first leg stream. A transfer permissioner 724 may perform a simple on-off switch function, allowing the content transferor 722 to either transfer payload completely or not at all, or the transfer permissioner 724 may filter the payload content, basing a transfer decision on the content, and/or transferring partial payload content based on the content. In accordance with another aspect of the invention, the transfer permissioner 724 may be coupled to an AT, which may authorize payload transfer based on address, signaling, and/or security policies and protocols.

Figure 8:
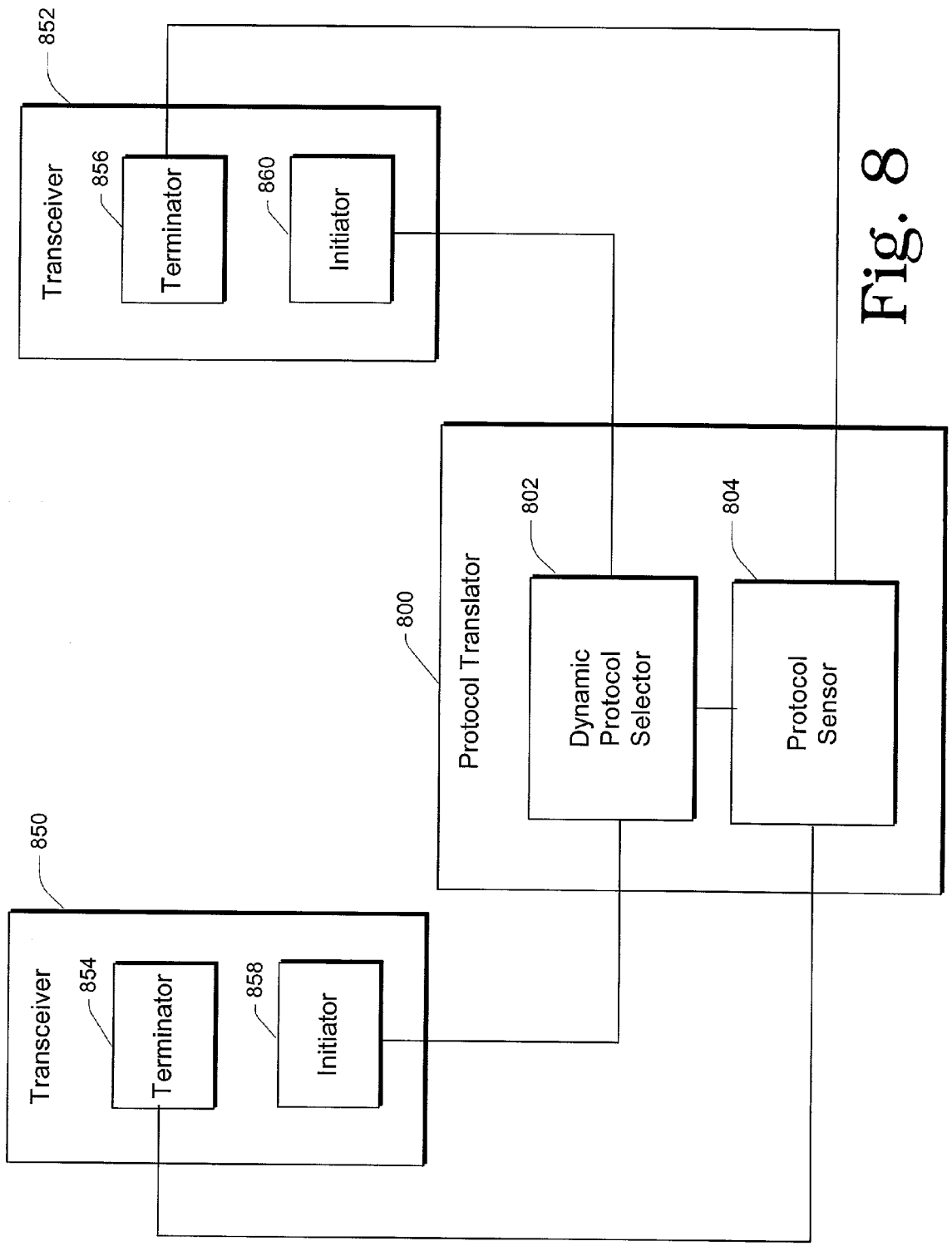
FIG. 8 is more detailed block diagram of the example protocol translator of FIG. 6 according to one example implementation of the present invention.

FIG. 8 shows the example protocol translator 800 of FIG. 6 in greater detail, coupled to elements of the stream transformer of FIG. 7. One or more protocol sensors 804 and one or more dynamic protocol selectors 802 may be included in implementations of the protocol translator 800. The illustrated protocol sensor 804 is coupled to the terminators 854, 856 of a stream transformer element. The protocol sensor 804 discovers the protocol being used by a network. The protocol sensor 804 may be coupled to the dynamic protocol selector 802, which simplistically speaking, may match the protocol of a communication being sent to a network with the protocol being received from the network. The dynamic protocol selector may be coupled to the initiators 858, 860 of the transceivers 850, 852 of a stream transformer to implement the protocols needed by the initiators 858, 860 when sending streams. It will be appreciated by those skilled in the art that the illustrated protocol translator 800 is only one example, and that various protocol translators within the scope of the invention are possible. The protocol translator 800 might be constructed and/or programmed to unchangingly translate between only two unchanging protocols. Protocol translation hardware and/or software relevant to the unchanging protocols used by the networks could be substituted for the protocol sensor 804 and the dynamic protocol selector 802.

Figure 9:
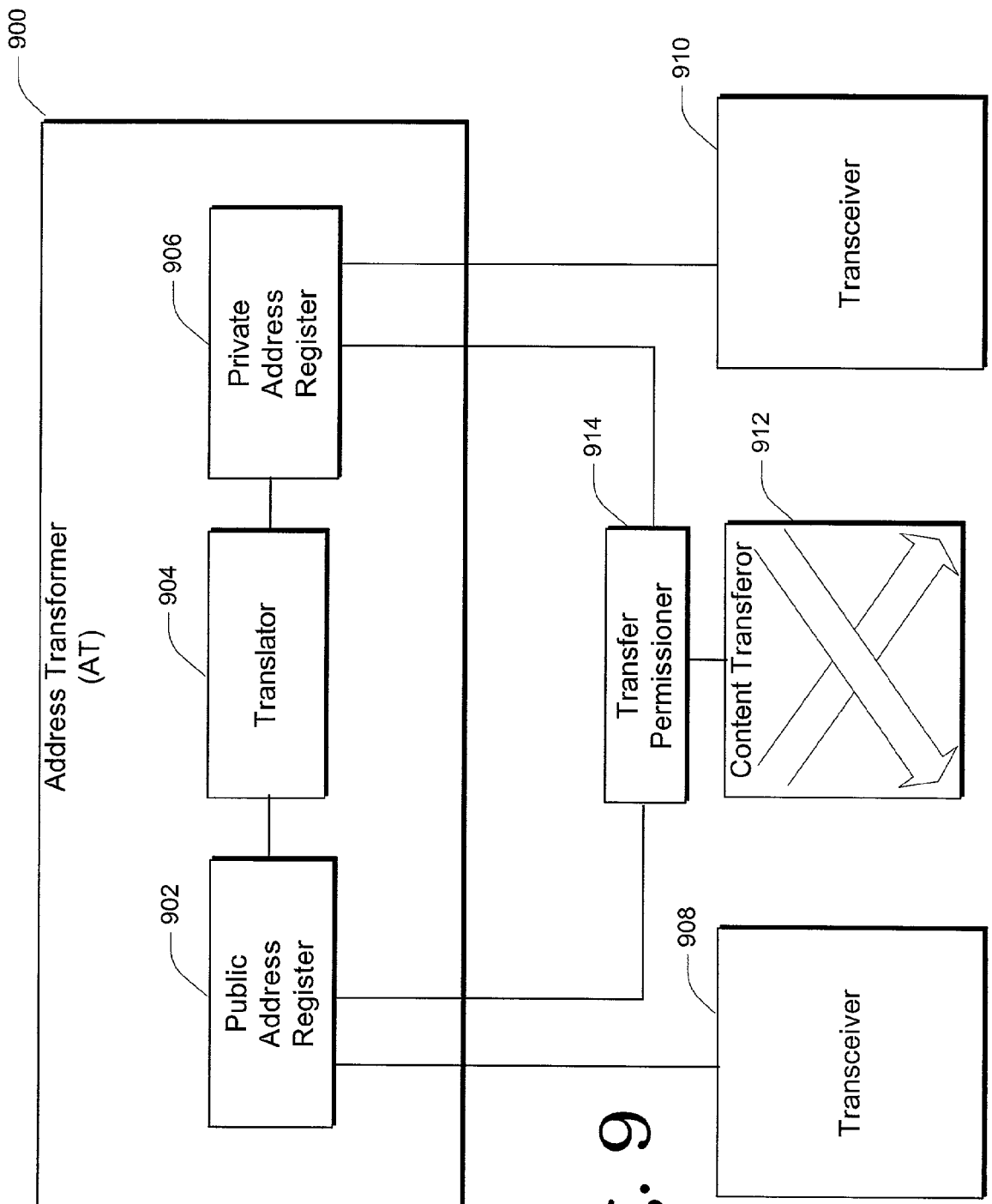
FIG. 9 is more detailed block diagram of the example AT of FIG. 6 according to one example implementation of the present invention.

FIG. 9 shows the example AT 900 of FIG. 6 in greater detail, coupled to elements of the example stream transformer shown in FIG. 7. A public address register 902, a translator 904, and a private address register 906 are coupled as depicted. The private address register 906 may receive the private addresses, for example from trusted clients, from a transceiver 910 on the trusted-network-side of a stream transformer. The private addresses and corresponding clients may be registered in a table and/or assigned a hash and passed to the translator 904, which in one embodiment may assign an alias, such as a public address or disguise to each private address.

The public address register 902 may make the aliases available to a transceiver 908 on the untrusted-network-side of a steam transformer. The aliases may be advertised or made available to any secure, non-secure, public, and/or private networks outside the boundary of the trusted network. The translator 904 may translate back and forth between aliases and private addresses as streams are terminated or initiated at the transceivers 908, 910 of a stream transformer. It will be appreciated by those skilled in the art that private addresses and aliases may take any form acceptable to protocols used on networks, for example IP addresses, telephone numbers, hardware addresses, and any other address or vector by which a client on a network can be communicated with.

Elements of the AT 900, such as the private address register 906 and the public address register 902 may be coupled to the transfer permissioner 914 of a stream transformer to participate in controlling the activity of a content transferor 912. For example, matching an alias destination address included in an incoming stream to a trusted address registered in the private address register 906 may be one criterion used by a transfer permissioiner 914 for allowing content transfer to proceed. Thus, in accordance with one aspect of the invention, the AT 900 provides a security measure in addition to the security measures provided by the network insulating and protocol translating features of a stream transformer and a protocol translator. Persons having ordinary skill in the art will appreciate that the depicted AT 900 is only one example of possible AT configurations within the scope of the invention.

In FIG. 10 is a flow chart of an example method for transforming telephony streams in accordance with one aspect of the present invention is presented. A first telephony stream having information content is received from a first client on a first network 1000. The first telephony stream is terminated at a boundary between the first network and a second network 1002. The first telephony stream may be non-secure, but security is assured by terminating the first stream and initiating a completely separate and secure second telephony stream for the second network. The second telephony stream having the information content is sent to a second client on the second network 1004. Since the first stream and the second stream are separate, they may use different protocols. Thus, a method of the invention may function simultaneously to provide security and protocol translation.

The method separates two or more networks on physical and protocol levels so that the networks do not have access to each other, except as allowed by the method to exchange the information content between the telephony streams. The two or more networks may be insulated, for example, by isolating a first physical network interface, a first packet network protocol stack, and a first packet telephony protocol stack for the first network from a second physical network interface, a second packet network protocol stack, and a second packet telephony protocol stack for the second network. Content from a first telephony stream may be transferred to the second telephony stream using an application level controller connected to the first packet telephony protocol stack and the second packet telephony protocol stack. While maintaining the insulation between the first packet telephony protocol stack and the second packet telephony protocol stack, the controller terminates the first telephony stream at boundary between networks and initiates the second telephony stream.

Figure 11:
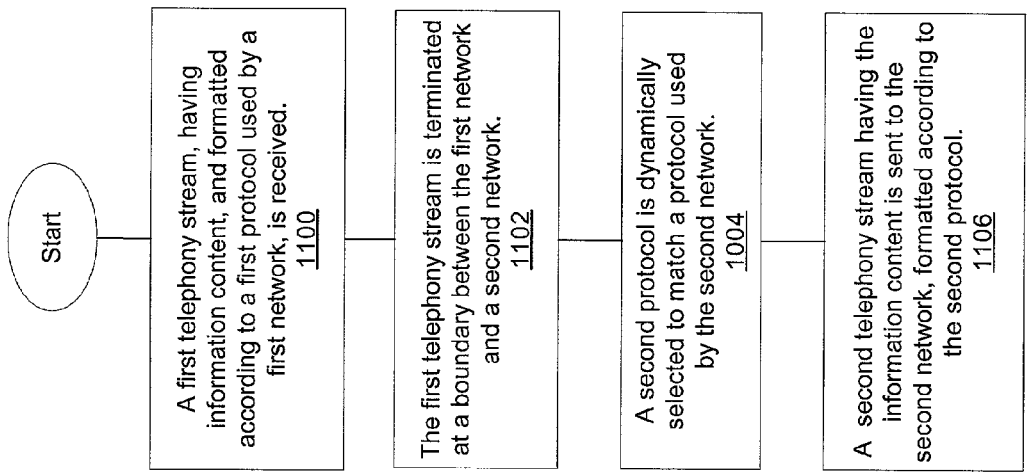
FIG. 11 is a flowchart of one example method of protocol translating, according to one aspect of the present invention.

FIG. 11 is a flow chart of an example method for protocol translation in accordance with one aspect of the present invention. An example first telephony stream is received, for example a non-secure first telephony stream that carries information content and is formatted according to a first protocol used by a first network 1100. The first telephony stream is terminated at a boundary between the first network and a second network 1102. A second protocol is dynamically selected to match a protocol used by the second network 1104. A second telephony stream, for example a secure second telephony stream that is capable (at some point depending on the embodiment of the method) of carrying the information content is formatted according to the second protocol and sent to the second network 1106.

The method may also include sensing the first protocol used by the first network and dynamically selecting a reception protocol for receiving the first telephony stream, sensing the second protocol used by the second network and dynamically selecting a transmission protocol for sending the second telephony stream, and/or transferring the content from the first telephony stream to the second telephony stream while insulating the first network from the second network.

Figure 12:
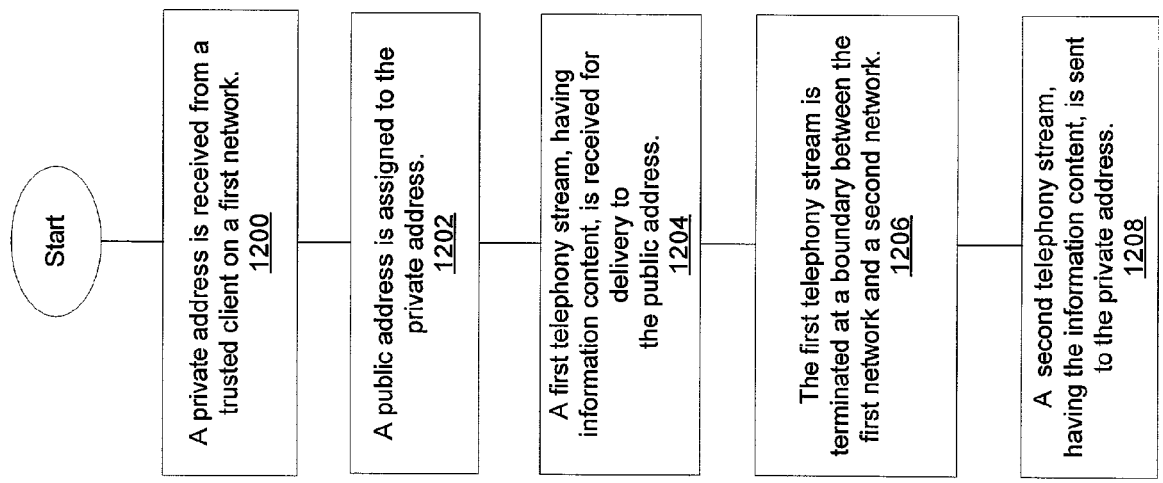
FIG. 12 is a flowchart of one example method of address transforming, according to one aspect of the present invention.

In FIG. 12, a flow chart of an example method for address transformation in accordance with one aspect of the invention is presented. A private address is received from a trusted client on a first network 1200. A public address is assigned to the private address 1202. A example non-secure first telephony stream, having content, is received for delivery to the public address 1204. The non-secure first telephony stream is terminated at a boundary between the first network and a second network 1206. An example secure second telephony stream, having the content, is sent to the private address 1208. A plurality of private addresses from trusted clients may be registered on the private network. Public addresses assigned to the private addresses may be publicized on public networks, and when a communication stream is received that has one of the public addresses as a destination, the ability to match the destination public address to a private address found on the private network can serve as one of the address transformation criteria.

Figure 13:
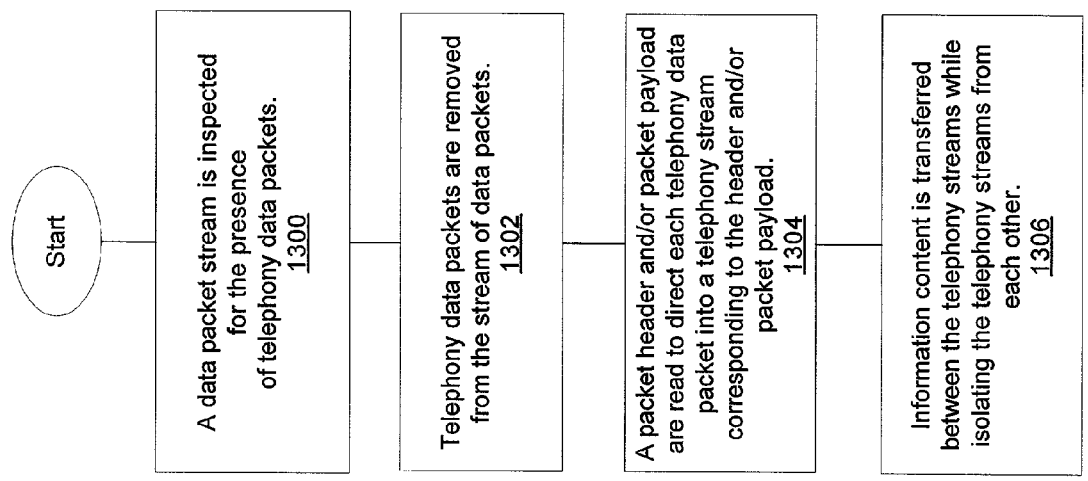
FIG. 13 is a flowchart of an example method of transforming packet telephony streams, according to a deep packet inspecting aspect of the invention.

FIG. 13 is a flowchart of another example method for transforming packet telephony streams, according to a deep packet inspection aspect of the invention. First, a data packet stream is inspected for the presence of telephony data packets 1300. The telephony data packets are removed from the stream of data packets 1302. The inspection and removal of the telephony data packets may be performed by a packet inspector 508 component of a deep packet inspection engine 509.

A telephony data packet header and/or a telephony data packet payload is read in order to direct each telephony data packet into a telephony stream corresponding to the header and/or payload 1304. In other words, the header and/or payload is read to ascertain an address or other identification data that associates the telephony data packet with its telephony stream. The reading of the header and/or payload and the directing of the telephony data packet into a corresponding telephony stream may be performed by a packet disassembler/reassembler (PDR) 510 component of a deep packet inspection engine 510.

Information content is transferred between telephony streams (for example a first telephony stream and a second telephony stream) while isolating the telephony streams from each other 1306. In the case of two telephony streams, a first protocol engine 504 may be used for the first telephony stream and a second protocol engine 506 may be used for the second telephony stream. A controller 502 may be coupled to the first and second protocol engines 504, 506 to perform the transferal of the information content between telephony streams.

FIG. 14 is a graphical representation of an article of manufacture 1400 of an alternate embodiment of the invention comprising a machine-readable medium having content 1402, that causes a machine to implement a PTT or related method of the invention. The method and apparatus of the invention may be provided partially or entirely as a computer program product that may include the machine-readable medium. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media suitable for storing electronic instructions. Moreover, embodiments of the invention may also be downloaded as a computer program product, wherein the program may be transferred from a remote computer to a requesting computer by way of data signals embodied in a carrier wave or other propagation media via a communication link (e.g., a modem or network connection).

The methods and apparatus are described above in their most basic forms but modifications could be made without departing from the basic scope of the invention. It will be apparent to persons having ordinary skill in the art that many further modifications and adaptations can be made without deviating from the spirit and scope of the present invention. The particular embodiments are not provided to limit the invention but to illustrate it. The scope of the invention is not to be determined by the specific examples provided above but only by the claims below.

The invention claimed is:

1. An apparatus, comprising:
   a controller to transfer information content between a first packet telephony stream on a first protocol stack from a first network and a second packet telephony stream on a second protocol stack from a second network;
   a stream transformer to send and receive the first packet telephony stream on one side of a boundary between the first and second networks and to send and receive the second packet telephony stream on the other side of the boundary wherein the stream transformer uses at least one of time division multiplexing (TDM) and exchange of data structures containing digitized segments of a telephony payload to transfer the information content and to maintain separation between the protocol stacks;

a protocol translator to translate a first protocol used on one side of the boundary into a second protocol used on the other side of the boundary;

an address translator (AT) to translate a first address used on one side of the boundary into a second address used on the other side of the boundary;

a first interface coupled to the controller for interfacing with the first network;

a second interface coupled to the controller for interfacing with the second network;

a packet inspection engine to inspect a data stream between the first network and the second network and to remove the telephony data packets from the data stream; and a packet disassembler/reassembler (PDR) to receive the telephony data packets from the packet inspection engine and read a header of each telephony data packet to direct each telephony data packet to a protocol stack responsible for a telephony stream.

2. The apparatus of claim 1, wherein at least one of the first and second networks are Internet protocol (IP) networks.

3. The apparatus of claim 2, the stream transformer further comprising:

a first transceiver to communicate with the first network and a second transceiver to communicate with the second network;

a first terminator and a first initiator included in the first transceiver to terminate and initiate packet telephony streams for the first network;

a second terminator and a second initiator included in the second transceiver to terminate and initiate packet telephony streams with the second network;

an information content transferor coupled to the first transceiver and the second transceiver to transfer information content between a packet telephony stream of the first network and a packet telephony stream for the second network while insulating the first network from the second network; and a connection permissioner coupled to the content transferor to enable a terminator in one transceiver to transfer contents of a packet telephony stream to an initiator in the other transceiver.

4. The apparatus of claim 2, the protocol translator further comprising:

a protocol sensor coupled to the first terminator and the second terminator to sense a first protocol used by the first network and a second protocol used by the second network; and a dynamic protocol selector to implement use of the first protocol by the first initiator and to implement use of the second protocol by the second initiator.

5. The apparatus of claim 2, the AT further comprising:

a private address register coupled to at least one transceiver and to a call permissioner of a stream transformer;

a public address register coupled to at least one transceiver and to the call permissioner of the stream transformer; and an address translator coupled to the private address register and to the public address register.

6. The apparatus of claim 2, wherein the first network and the second network are any combination of secured and non-secured networks.

7. The apparatus of claim 2, wherein the first network and the second network are any combination of private and public networks.

8. The apparatus of claim 2, wherein the first network and the second network use different packet protocols.

9. A packet telephony transformer, comprising:

a controller to control the transfer of call content between a first network and a second network and to insulate a first packet telephony stream of the first network from a second packet telephony stream of the second network;

a first protocol engine communicatively coupled to the controller to process connection protocols and to transfer call content for the first packet telephony stream;

a second protocol engine communicatively coupled to the controller and to the first protocol engine to process connection protocols and to transfer call content for the second packet telephony stream;

a packet disassembler/reassembler (PDR) coupled to the controller and to the protocol engines to pass a telephony data packet to either the first protocol engine or the second protocol engine based on a header of the telephony data packet; and a packet inspector coupled to the controller and to the PDR to inspect a data stream between the first network and the second network and to remove telephony data packets from the data stream for transfer to the PDR.

10. The packet telephony transformer of claim 9, wherein the first protocol engine and/or the second protocol engine include multiple protocol sub-engines for processing multiple protocols within one protocol engine.

11. The packet telephony transformer of claim 9, further comprising a first network interface coupled to the packet inspector and to the first network and a second network interface coupled to the packet inspector and to the second network.

* * * * *

UNITED STATES PATENT AND TRADEMARK OFFICE
CERTIFICATE OF CORRECTION

PATENT NO. : 7,668,306 B2 Page 1 of 1
APPLICATION NO. : 10/095138
DATED : February 23, 2010
INVENTOR(S) : Strathmeyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1590 days.

Signed and Sealed this

Fourth Day of January, 2011

David J. Kappos
*Director of the United States Patent and Trademark Office*